United States Patent
Jiang et al.

(10) Patent No.: US 12,508,228 B2
(45) Date of Patent: Dec. 30, 2025

(54) PFD LOADED MICROSPHERES AND METHOD FOR PREPARING INJECTABLE COMPOSITE MICROSPHERE HYDROGEL SOLUTION FROM SAME

(71) Applicant: The Chinese University of Hong Kong, Hong Kong (CN)

(72) Inventors: Yangzi Jiang, Hong Kong (CN); Xiaobo Zhu, Hong Kong (CN)

(73) Assignee: The Chinese University of Hong Kong, Hong Kong (CN)

( * ) Notice: Subject to any disclaimer, the term of this patent is extended or adjusted under 35 U.S.C. 154(b) by 0 days.

(21) Appl. No.: 17/932,740

(22) Filed: Sep. 16, 2022

(65) Prior Publication Data
US 2023/0310322 A1      Oct. 5, 2023

Related U.S. Application Data

(60) Provisional application No. 63/362,181, filed on Mar. 30, 2022.

(51) Int. Cl.
*A61K 9/16*      (2006.01)
*A61K 9/50*      (2006.01)
*A61K 31/4418*   (2006.01)

(52) U.S. Cl.
CPC .......... *A61K 9/1694* (2013.01); *A61K 9/1647* (2013.01); *A61K 9/5031* (2013.01); *A61K 9/5089* (2013.01); *A61K 31/4418* (2013.01)

(58) Field of Classification Search
CPC ............. A61K 9/1694; A61K 9/1647; A61K 9/5031; A61K 9/5089; A61K 31/441
See application file for complete search history.

(56) References Cited

U.S. PATENT DOCUMENTS

| | | | |
|---|---|---|---|
| 9,872,881 B2 | 1/2018 | Swami et al. | |
| 2011/0274759 A1 | 11/2011 | Troiano et al. | |
| 2015/0196543 A1* | 7/2015 | Surber ............... | A61P 35/00 514/345 |
| 2017/0079989 A1* | 3/2017 | Dinh ................. | A61K 31/12 |
| 2017/0266168 A1* | 9/2017 | Chan ................. | A61K 31/4412 |
| 2019/0224132 A1* | 7/2019 | Sharma ............. | A61K 38/1858 |
| 2020/0093769 A1 | 3/2020 | Sirianni et al. | |

FOREIGN PATENT DOCUMENTS

| | | |
|---|---|---|
| CN | 105126166 B | 11/2017 |
| EP | 3 747 460 A1 | 12/2020 |
| WO | 2014/018668 A2 | 1/2014 |
| WO | 2021/260217 A1 | 12/2021 |
| WO | 2023/118324 A1 | 6/2023 |

OTHER PUBLICATIONS

Park, Tae Gwan. "Degradation of poly (D, L-lactic acid) microspheres: effect of molecular weight." Journal of Controlled Release 30.2 (1994): 161-173.). (Year: 1994).*
Makadia, Hirenkumar K, and Steven J Siegel. "Poly Lactic-co-Glycolic Acid (PLGA) as Biodegradable Controlled Drug Delivery Carrier." Polymers vol. 3,3 (2011): 1377-1397. doi:10.3390/polym3031377 (Year: 2011).*
Gentile, Piergiorgio et al. "An overview of poly(lactic-co-glycolic) acid (PLGA)-based biomaterials for bone tissue engineering." International journal of molecular sciences vol. 15,3 3640-59. Feb. 28, 2014, doi:10.3390/ijms15033640 (Year: 2014).*
Liu, Xiao'an, et al. "The antiangiogenesis effect of pirfenidone in wound healing in vitro." Journal of Ocular Pharmacology and Therapeutics 33.9 (2017): 693-703. (Year: 2017).*
Noda T, Okuda T, Mizuno R, Ozeki T, Okamoto H. Two-Step Sustained-Release PLGA/Hyaluronic Acid Gel Formulation for Intra-articular Administration. Biol Pharm Bull. 2018;41(6):937-943. doi: 10.1248/bpb.b18-00091. PMID: 29863082. (Year: 2018).*
Jiang, Y. "Osteoarthritis year in review 2021: biology." Osteoarthritis and cartilage vol. 30,2 (2022): 207-215. doi:10.1016/j.joca.2021.11.009 (Year: 2022).*
Zhu, Xiaobo et al. "Intra-articular sustained-release of pirfenidone as a disease-modifying treatment for early osteoarthritis." Bioactive materials vol. 39 255-272. May 23, 2024, doi:10.1016/j.bioactmat.2024.05.028 (Year: 2024).*
Fava, R., et al., "Active and Latent Forms of Transforming Growth Factor Beta Activity in Synovial Effusions," J. Exp. Med., 1989, 169:291-296.
Couchourel, D., et al., "Altered Mineralization of Human Osteoarthritic Osteoblasts Is Attributable to Abnormal Type I Collagen Production," Arthritis Rheum., 2009, pp. 1-23.
Zhu, X., et al., "Subchondral Bone Remodeling: A Therapeutic Target for Osteoarthritis," Frontiers in Cell and Developmental Biology, 2021, 8:1-19.
Maher, T.M., et al., "Pirfenidone in patients with unclassifiable progressive fibrosing interstitial lung disease: a double-blind, randomised, placebo-controlled, phase 2 trial," Lancet Respir Med., 2020, 8:147-157.
Zhu, X., et al., "Intra-articular sustained-release of pirfenidone as a disease-modifying treatment for early osteoarthritis," Bioactive Materials, 2024, 39:255-272.

(Continued)

*Primary Examiner* — Brian-Yong S Kwon
(74) *Attorney, Agent, or Firm* — SALIWANCHIK, LLOYD & EISENSCHENK (57) ABSTRACT

A therapeutic sustained delivery vehicle (TSDV) includes a plurality of microparticles with pirfenidone (PFD) within a poly(lactic-co-glycolic acid) (PLGA) matrix, where the microparticles are suspended in a hyaluronic acid (HA) solution. This suspension of microparticles are useful for injection into a joint that suffers from osteoarthritis (OA) inflammation and pain. The microparticles are microspheres formed by forming a solution of PDF and PLGA in a water insoluble organic solvent that is emulsified with an aqueous solution. Upon evaporation of the organic solvent the resulting microspheres are separated from the suspension. The microspheres are suspended in a HA solution. An OA treatment is a periodic injection protocol that provides a long-term in vivo controlled-release PFD to modulate and attenuate the OA progression.

13 Claims, 7 Drawing Sheets

(56) References Cited

OTHER PUBLICATIONS

Chan, D.D., et al., "Deficiency of hyaluronan synthase 1 (Has1) results in chronic joint inflammation and widespread intra-articular fibrosis in a murine model of knee joint cartilage damage," Osteoarthritis and Cartilage, 2015, 23:1879-1889.

Chan, D.D., et al., "Pirfenidone Reduces Subchondral Bone Loss and Fibrosis After Murine Knee Cartilage Injury," Journal of Orthopaedic Research, 2018, 36:365-376.

Gelse, K., et al., "Molecular differentiation between osteophytic and articular cartilage—clues for a transient and permanent chondrocyte phenotype," Osteoarthritis and Cartilage, 2012, 20:162-171.

* cited by examiner

FIG. 7B ize of about 1,200 kDa to about 6,000 kDa and HA solution can

PFD LOADED MICROSPHERES AND METHOD FOR PREPARING INJECTABLE COMPOSITE MICROSPHERE HYDROGEL SOLUTION FROM SAME

CROSS-REFERENCE TO RELATED APPLICATION

This application claims the benefit of U.S. Provisional Application Ser. No. 63/362,181, filed Mar. 30, 2022 which is hereby incorporated by reference in its entirety including any tables, figures, or drawings.

BACKGROUND OF THE INVENTION

Osteoarthritis (OA) is the most common degenerative joint disease. Intraarticular injection (IA) of hyaluronic acid (HA) is one of therapies for knee OA patients before surgery intervention, and non-steroidal anti-inflammatory drugs (NSAIDs) are used to relieve pain, reduce inflammation for symptomatic management.

Emerging evidence indicates that subchondral bone remodeling plays an important role in the OA development, and this is along with the cartilage injury and degeneration, particularly in early OA. Cartilage loss, joint inflammation, and sclerosis in subchondral bone are the main characteristics in the late stage of OA joints, in which the transforming growth factor (TGF)β1 signaling is actively involved. Elevated expression level of TGFβ1 was found in joint cavity (in healthy synovial fluid: <1 ng/ml; in early OA synovial fluid: ~2 ng/ml; in late OA synovial fluid: ~5 ng/ml). Pathologically, the excessively expressed TGFβ1 in OA joints enhanced subchondral bone sclerosis, which is mainly contributed by the enhanced vascularization, and the hypomineralizaiton of osteoblasts.

Pirfenidone (PFD) is an anti-fibrotic drug for idiopathic pulmonary fibrosis treatments (administrative dosage: 800-2,400 mg/person/day, estimated ~13-39 μg/ml/day), and it could reduce lung fibrosis by inhibiting fibroblast proliferation and collagen production. As a TGFβ1 inhibitor, PFD could also reduce the production of TGFβ1 and other inflammatory mediators such as tumor necrosis factor alpha and Interleukin-1β, thus is with anti-inflammatory properties. The clinical applications of PFD are mainly daily oral administration.

To this end, an early OA intervention by locally regulating TGFβ1 signaling is desirable. An intervention using a controlled-release biomaterial for intraarticular delivery of a TGFβ1 inhibitor to prevent the subchondral bony changes and other OA pathological features, such as synovial inflammation and chronic pain, in OA progression is presented herein.

BRIEF SUMMARY OF THE INVENTION

An embodiment is directed to a therapeutic sustained delivery vehicle (TSDV). The TSDV includes the drug, a vehicle for the drug, and a delivery solution. The TSDV has a plurality of microparticles with pirfenidone (PFD) within a poly(lactic-co-glycolic acid) (PLGA) matrix, where the microparticles are suspended in a hyaluronic acid (HA) solution. The PLGA matrix can have, but is not limited to, a 50:50, lactic:glycolic repeating unit ratio and a molecular weight of 20 to 50 kDa. The weight ratio of PFD to PLGA can be, but is not limited to, about 1:2. The HA of the HA solution can be, but is not limited to, of a molecular weight of about 1,200 kDa to about 6,000 kDa and HA solution can be, but is not limited to, about 0.5 to about 3% HA in a stroke-physiological saline solution (SPSS) or phosphate buffer solution (PBS). The microparticles can be suspended at, but is not limited to, about 6 mg/ml in the HA solution. The TSVD can have, but is not limited to, a PFD dosage of about 100 μg/ml. The TSDV allows sustained release to a patient, for example, but not limited to, in a joint inflicted with osteoarthritis (OA) over a period of about two weeks to one month or more after injection.

Another embodiment is directed to a method of preparing a TSDV, wherein a plurality of microparticles comprise pirfenidone (PFD) within a poly(lactic-co-glycolic acid) (PLGA) matrix wherein the microparticles are suspended in a hyaluronic acid (HA) solution. The microparticles are formed by combining PFD and PLGA in a water insoluble organic solvent to form an organic solution that is added to a polyvinyl alcohol solution, or other aqueous solution, to form an oil in water emulsion that is stirred while the organic solvent evaporates from the emulsion to yield a suspension of microparticles. The microparticles are subsequently isolated from the suspension by, for example, but not limited to, centrifugation. The microparticles can be further isolated by subsequent washing, resuspending, re-centrifuging, and lyophilizing.

Another embodiment is directed to a method where the TSDV is used to treat a joint inflicted with osteoarthritis (OA). The treatment incudes periodically injecting the TSDV described herein into a joint, where the period can be about one injection treatment to the joint per month.

DETAILED DISCLOSURE OF THE INVENTION

An embodiment provides a therapeutic sustained delivery vehicle (TSDV) of a TGFβ1 inhibitory drug 5-methyl-1-phenyl-2-(1H)-pyridone (pirfenidone) (PFD), shown below, for delivery to joints to delay the development of joint inflammation disease, such as, but not limited to, osteoarthritis (OA). The TSDV includes PFD loaded in poly(lactic-co-glycolic acid) (PLGA) microspheres suspended in a carrier fluid. The carrier fluid is a hyaluronic acid (HA) solution, which can enhance joint lubrication and reduce inflammation, for example, but not limited to, OA-related inflammation. PLGA-PFD controls and maintains the released PFD in a functional and safe concentration. The HA helps to maintain the PLGA particle within in the joint cavity to enhance the local PFD retention. The TSDV is administrated with monthly intraarticular (IA) injections. HA is a symptom-relief intervention, but commercial HA does not protect against OA-related joint structural alterations or delay the disease's progression. The TSDV, according to an embodiment, provides a long-term controlled-release of PFD from the PLGA matrix, and with addition of HA, modulates and attenuates the OA phenotype and pain behaviors, such as the joint inflammation and synovitis, subchondral bone pathology, osteophyte formation, and pain-related behavioral alterations.

PFD

Figure 1:
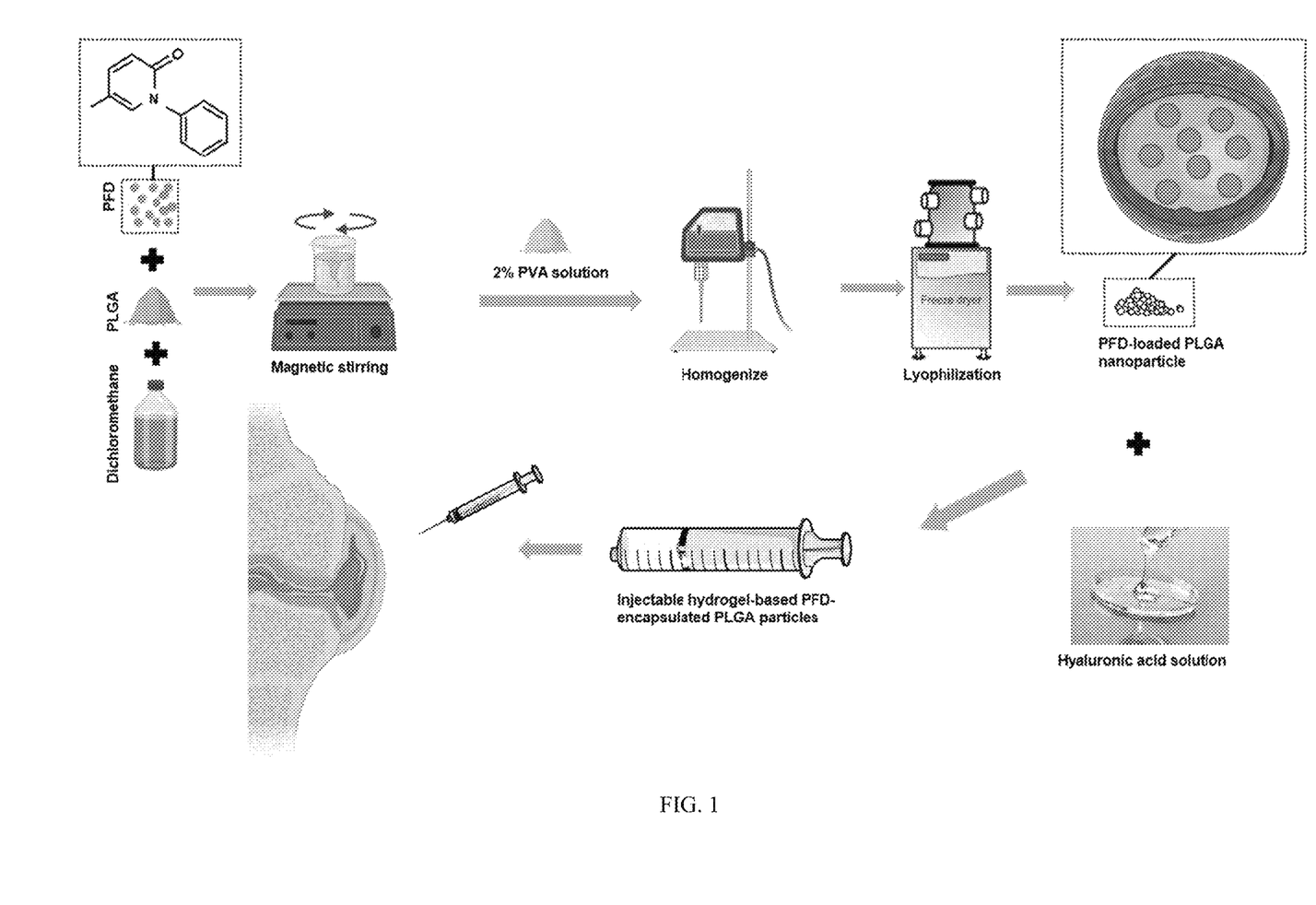
FIG. 1 is a scheme of a protocol to fabricate the PFD-loading PLGA microspheres, according to an embodiment.
Figure 2A:
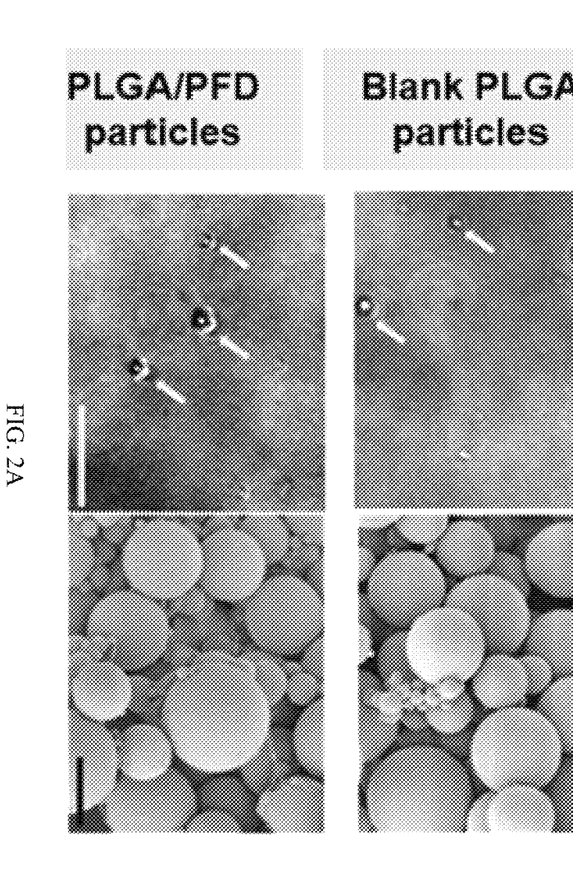
FIG. 2A shows a scanning electron microscope (SEM) images for PLGA and PFD-PLGA microspheres, according to an embodiment, where white bar=500 mm and black bar=1 mm.

As shown in FIG. 1, the TSDV, according to a specific embodiment, includes: PFD to inhibit TGFβ1 signaling; poly(lactic-co-glycolic acid) PLGA, for example, but not limited to, 50:50, lactic:glycolic with a molecular weight (MW) of 20-50 kDa as the time release drug carrier that forms a microparticle; and HA with a MW of about 1,200 kDa to about 6,000 kDa at about 0.5 to about 3% HA in a stroke-physiological saline solution (SPSS) or phosphate buffer solution (PBS) as the suspending fluid of the microparticles. The weight ratio of PFD to PLGA can be, but is not limited to about 1:2. As shown in FIG. 2A the PFD-PLGA microparticles are in the form of spheres that differ insignificantly in size from PLGA particles prepared in like manner, as shown in FIG. 2B, where these particles have the characteristics in Table 1, below.

TABLE 1

Figure 2B:
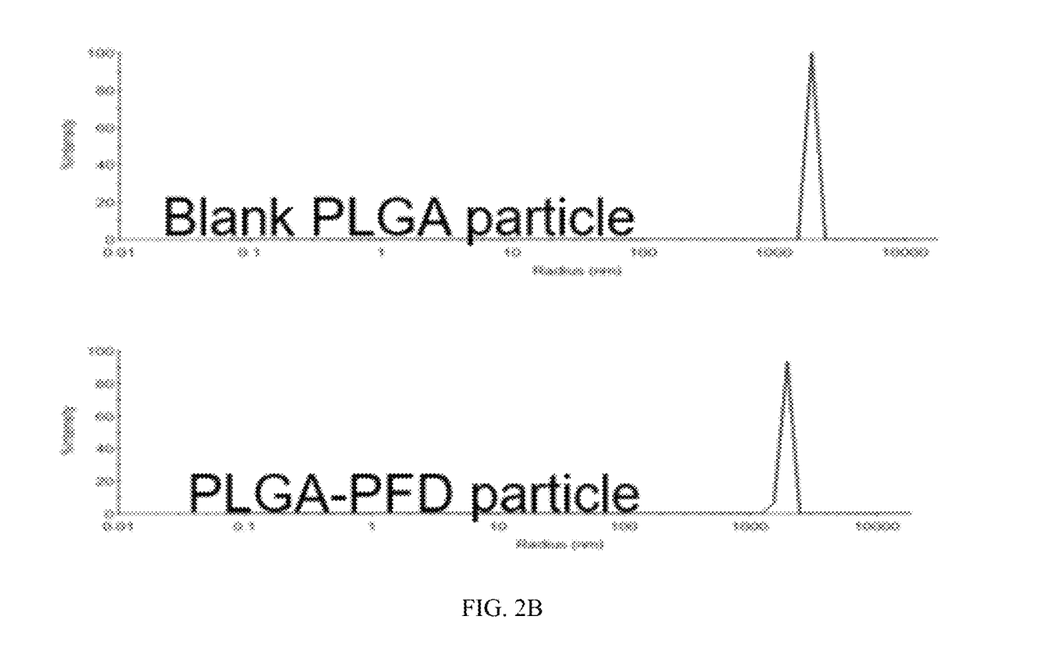
FIG. 2B shows plots of the particles size vs. intensity by dynamic light scattering that indicates size distributions for PLGA and PFD-PLGA microspheres, according to an embodiment.

| Radius and Dispersity of the Microparticles of FIG. 2B. | | |
|---|---|---|
| Sample | Mean Radius (nm) | Polydispersity Index (%) |
| Blank | 1221.33 ± 261.69 | 11.77 ± 0.71 |
| PFD-Loaded | 1322.63 ± 266.93 | 12.17 ± 0.55 |

PLGA can be substituted or supplemented with polycaprolactone (PCL), polylactic acid (PLA), poly (glycolic-acid) (PGA), poly (lactide-co-caprolactone), polyethylene adipate, polybutylene succinate, polyhydroxybutyrate, polyhydroxyalkanoate, or poly(3-hydroxybutyrate-co-3-hydroxyvalerate), thought the release behavior will differ for the various homopolymer compositions and different based on the co-repeating group proportions.

According to an embodiment, as shown in FIG. 1, a method to prepare the TSDV involves dissolving the PFD and the PLGA with agitation in a water insoluble organic solvent, illustrated with, in an exemplary embodiment, but not limited to, dichloromethane, and adding this solution into an aqueous solution, illustrated in an exemplary embodiment as a 2% polyvinyl alcohol (PVA) solution. Homogenization is performed to form an oil-in-water emulsion that is stirred during evaporation of the water insoluble organic solvent from the emulsion; followed by freeze drying the aqueous solution to form spherical nanoparticles of the PFD-PLGA nanoparticles. The PFD-PLGA nanoparticles are suspended in a hyaluronic acid stroke-physiological saline solution (SPSS) or phosphate buffer solution (PBS) to form the fluid TSDV for injection into the joint.

Another embodiment is directed to a therapeutic strategy for sustained delivery of the TGFβ1 inhibitory drug PFD to joints for delaying the development of joint inflammation disease such as osteoarthritis. The therapy involves a treatment of OA or related inflammations by a time release of the PFD from the PFD-PLGA microparticles contained in the TSDV after intraarticular injection into the joint. The periodic injection of the TSDV modulates and attenuates the OA progression, treating or relieving joint inflammation and synovitis, subchondral bone pathology, osteophyte formation, and pain-related behavioral alterations. The TSDV used as a treatment for OA can be applied for treating other diseases with similar pathology. Human patients can benefit by this a clinical treatment, as all elements of the compositions are FDA approved. This therapy can be employed as a disease-modifying osteoarthritis drug (DMOAD). The treatment with TSDV is effective for pain relief. This pain relief in a sustained fashion is a significant feature of this treatment.

Figure 3:
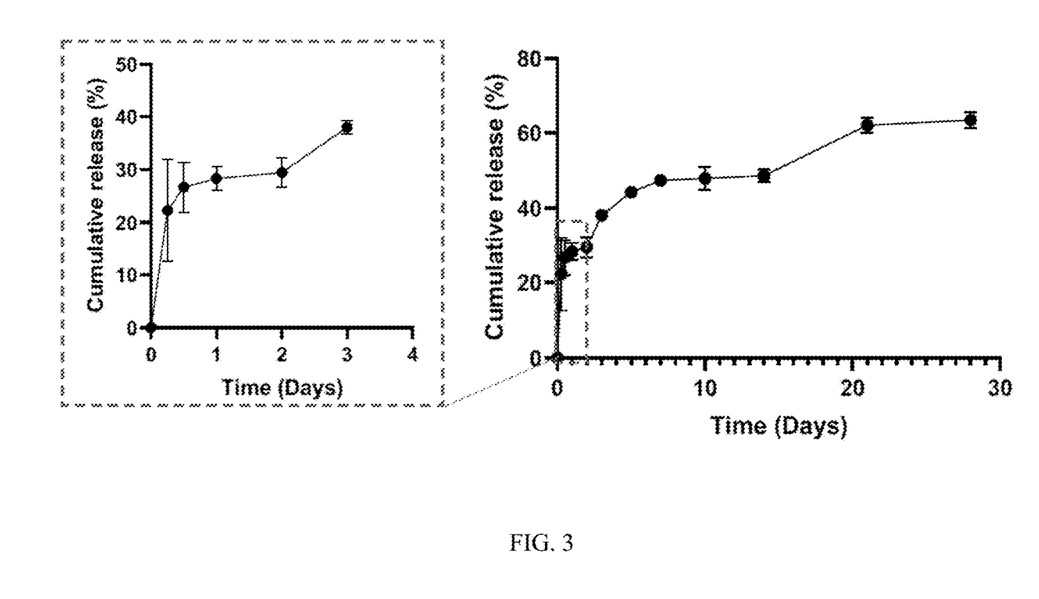
FIG. 3 shows a plot of the controlled-release (cumulative) over a month of the PFD from the PFD-PLGA microspheres.

Time release behavior has been illustrated by placing a dialysis membrane bag containing the microparticles in an aqueous solution at normal body temperature to measure the release of PFD over a month. As shown in FIG. 3, release occurred over 30 days with about 40% release occurring over the initial three days and about 60% released over the thirty days.

Figure 4A:
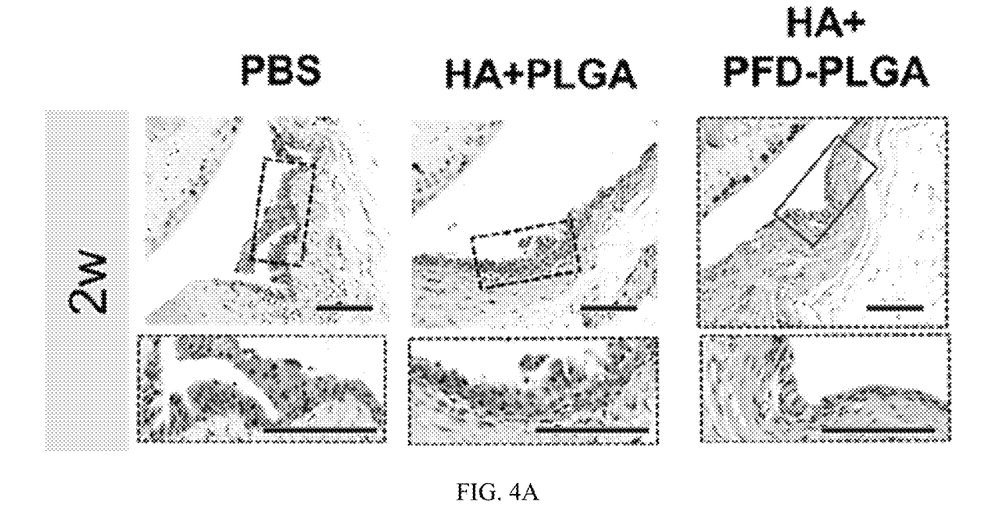
FIG. 4A shows histological images of H&E stained mouse's joint synovium samples two weeks after destabilization of the medial meniscus (DMM) surgery and one week after injection with PBS, HA and PLGA, and HA and PFD-PLGA, according to an embodiment, where the black bars indicate the relative amplification of the image and a highlighted portion of the image.
Figure 4B:
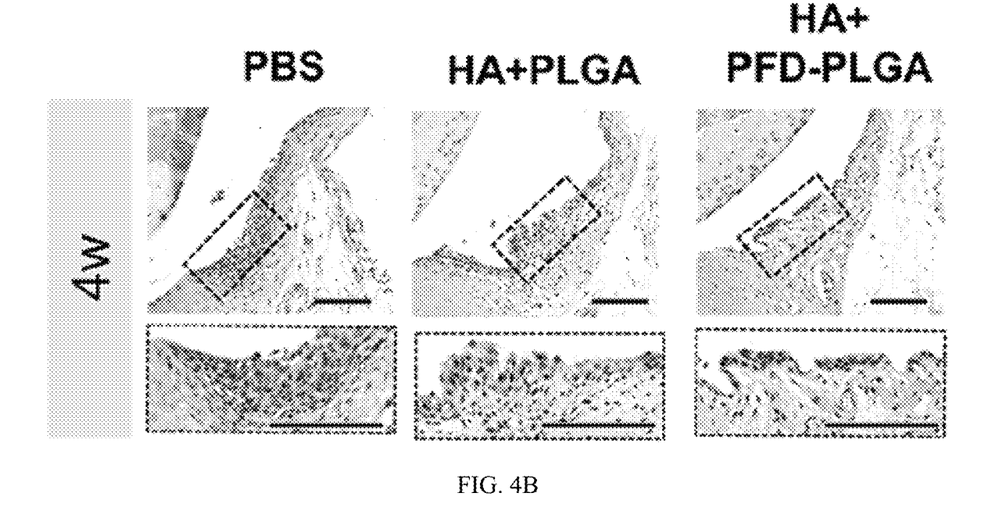
FIG. 4B shows histological images of H&E stained mouse's joint synovium samples four weeks after DMM surgery and three weeks after injection with PBS, HA and PLGA, and HA and PFD-PLGA, according to an embodiment, where the black bars indicate the relative amplification of the image and a highlighted portion of the image.

The efficacy of the TSDV towards OA type inflammation is apparent from an animal model that allows examination of the joint after destabilization of the medial meniscus (DMM) in C57B6 mice. Surgery performed on the right knee joint, and the same surgery was performed on the contralateral knee. FIG. 4A shows hematoxylin and eosin (H&E) staining results of mice knee joints injected two weeks after OA was induced in a mice joint by surgical destabilization of the medial meniscus (DMM), which is one week after a first injection. FIG. 4B shows H&E staining results at four weeks after DMM surgery, which is three weeks after the first injection. The thickened of the knee synovium of DMM indicates joint inflammation remains after being injected with either PBS solution or PLGA particles in a HA solution at two weeks and four weeks. In contrast, as shown in FIGS. 4A and 4B, upon injection of TSDV to the joint with instability induced, a week after DMM shows a loss of inflammation over that period, as the synovial lining cell layer remains thin at two and four weeks.

Figure 5A:
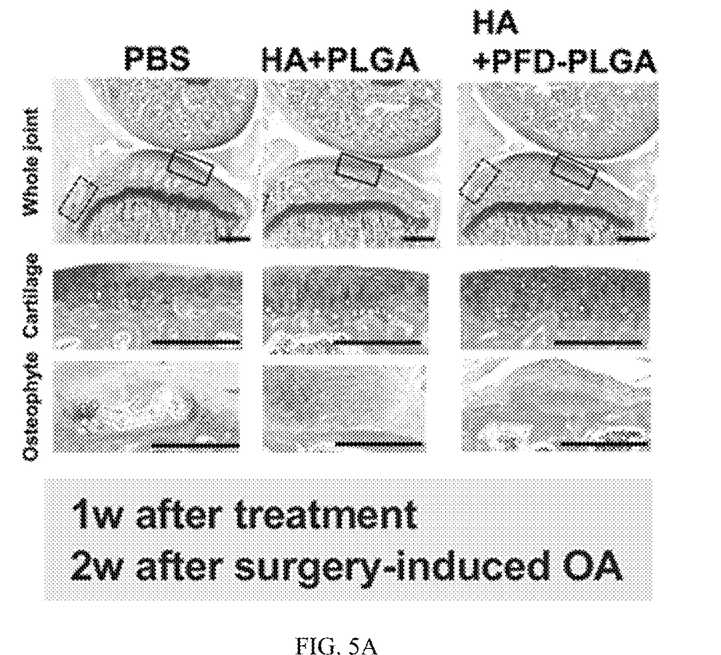
FIG. 5A shows histological images of Safranin O stained mouse's joint samples two weeks after DMM surgery and one week after injection with PBS, HA and PLGA, and HA and PFD-PLGA, according to an embodiment, where the black bars indicate the relative amplification of the image and a highlighted portion of the image.
Figure 5B:
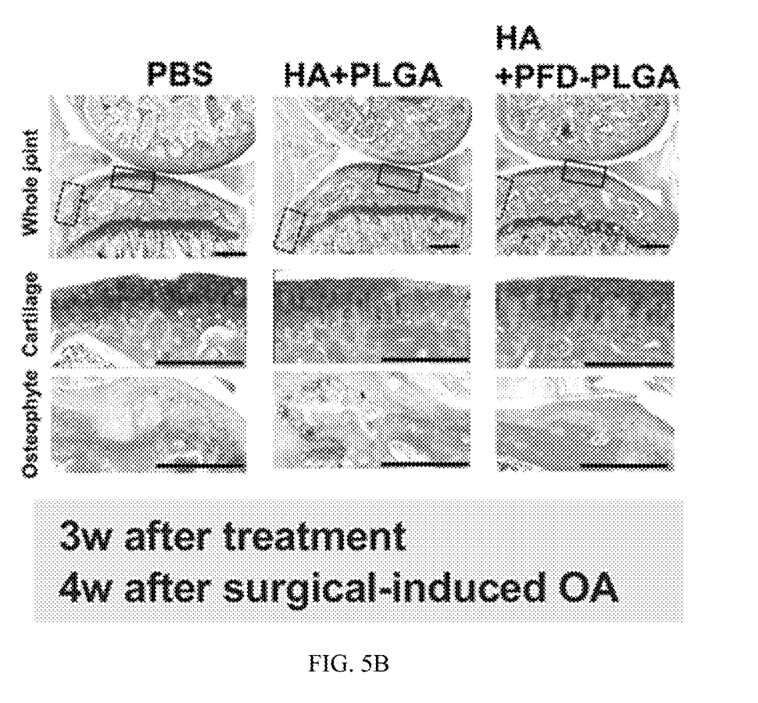
FIG. 5B shows histological images of Safranin O mouse's joint samples four weeks after DMM surgery and three weeks after injection with PBS, HA and PLGA, and HA and PFD-PLGA, according to an embodiment, where the black bars indicate the relative amplification of the image and a highlighted portion of the image.

In like manner, Safranin O staining, as shown in FIGS. 5A and 5B, indicates that the cartilage and subchondral bone structure of the DMM afflicted mice undergo some fibrillations on articular surfaces and osteophyte formation when PBS and HA+PLGA were injected at 2 weeks and 4 weeks after DMM surgery, but that osteophyte formation is inhibited after PFD-PLGA+HA treatment group. This indicates the ability of the TSDV to be an effective long-term treatment. This treatment can be a monthly administration of the TSDV therapy to achieve attenuation of OA phenotypes such as synovial fibrosis and inflammation, cartilage degeneration, and osteophyte formation.

Figure 6A:
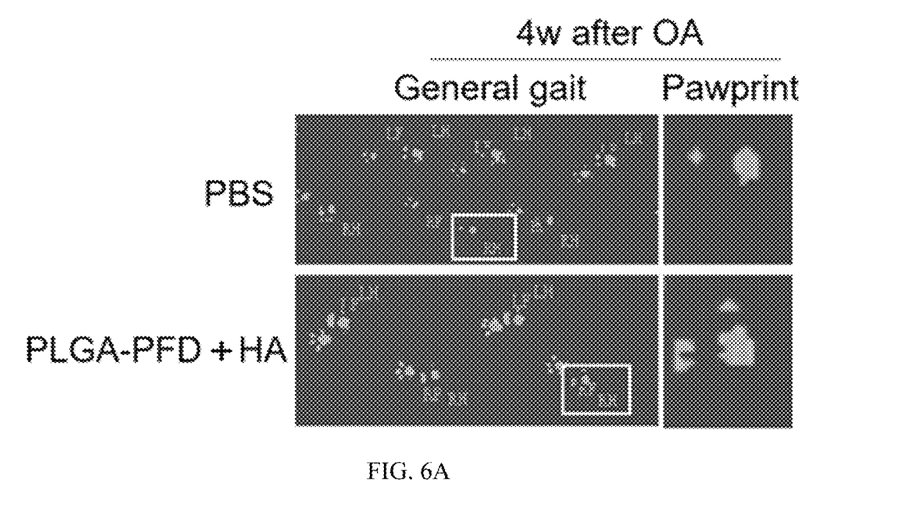
FIG. 6A shows a paw print track using a catwalk analysis where the general gait of DMM injured mice four weeks after DMM surgery and three weeks after a first injection with a PBS control and a therapeutic sustained delivery vehicle (TSDV), according to an embodiment, indicates a relief of pain with the TSDV treatment.
Figure 6B:
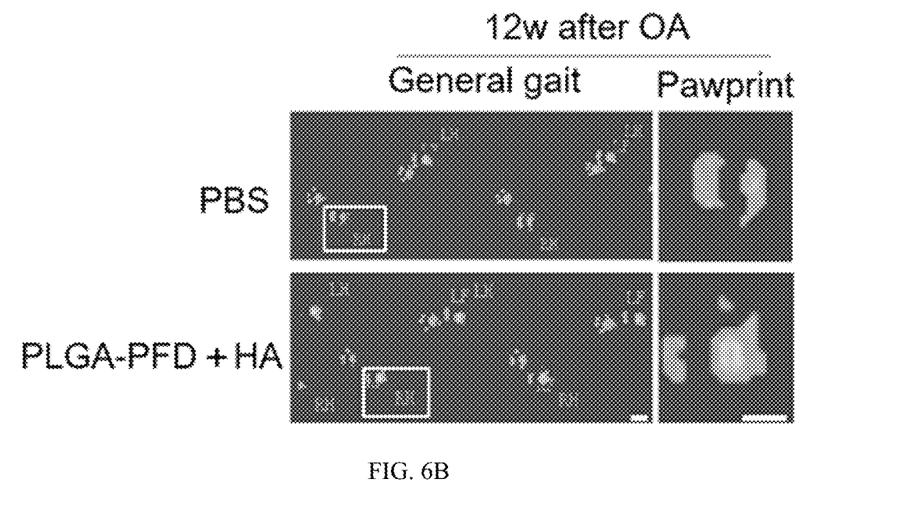
FIG. 6B shows a paw print track using a catwalk analysis where the general gait of DMM injured mice twelve weeks after DMM surgery and three weeks after a third injection with a PBS control and a TSDV, according to an embodiment, indicates a relief of pain with the TSDV treatment.

The pain induced by the DMM surgery and the relieve of this OA pain by the TSDV is indicated by the gait behavior displayed by mice without and with treatment. Gait behavior is indicated by the footprints of mice recorded using the Catwalk System. As shown in FIGS. 6A and 6B, pawprints recorded four weeks after DMM surgery, which is three weeks after a first injection, and twelve weeks after DMM surgery, which is three weeks after a third injection, respectively, indicates the effectiveness of the TSDV.

Following are examples that illustrate procedures for practicing the invention. These examples should not be construed as limiting. All percentages are by weight and all solvent mixture proportions are by volume unless otherwise noted.

Materials and Methods

Preparation of PFD-PLGA Microspheres

Dissolve 50 mg of PFD in 100 mg of PLGA in 3.3 ml dichloromethane to form a solution. Cool the solution in an ice bath and add the solution to 5 ml of 2% polyvinyl alcohol (PVA) dropwise with homogenize over five minutes to obtain an oil/water emulsion. The emulsion is warmed to room temperature and stirred magnetically overnight to evaporate the dichloromethane and obtain precipitated microspheres. The microspheres were washed with distilled $H_2O$, centrifuged at 30,000 rpm for 30 minutes, resuspended in water, recentrifuged, and lyophilized to obtain the PFD-PLGA particles. Particles were stored at −80° C. Particles were characterized to have a spherical morphology where the spheres have a smooth surface by scanning electron microscope (SEM), as shown in FIG. 2A. Particles were analysed by dynamic lighting scattering where the PFD-PLGA microspheres have an average diameter of 1322.63 nm and the average diameter of PLGA microspheres for use as a control have an average diameter of 1221.33 nm.

Preparation of the TSDV

PFD-PLGA microspheres (6.04 mg/ml) and hyaluronic acid (HA, high molecular weight, 1,200 kDa-1,500 kDa, 1.5%) were added to a stroke-physiological saline solution (SPSS) or a phosphate buffer solution (PBS) to form an effective dosage of 100 μg/ml PFD for in vivo administration.

Controlled Release of PFD

Into a bag formed from a dialysis membrane with a molecular weight cut-off of 10 kDa was placed 5 mg of PFD-PLGA microspheres in 1 ml PBS. The PFD was released in a PBS buffer with a total volume of 5 ml. The buffer was separated from the bag and replaced with fresh 5 ml PBS buffer at 6, 12, 24, 48, and 72 hours and subsequently at 5, 7, 10, 14, 21, and 28 days and the released PFD concentration in these solutions were analysed by UV absorbance at 330 nm to determine the quantity of PFD released. As illustrated in the insert of FIG. 3, the release from the PFD-PLGA microspheres shows a burst release over the first three days, releasing about 40% of the total PFD in the PFD-PLGA microspheres, sustaining the release of PFD over a month with about half of the total drug released by the second week.

In Vivo Analysis

The destabilization of the medial meniscus (DMM) in C57B6 mice constituted a DMM-induced OA model. Surgery was performed on the right knee joint, and the same surgery was performed on the contralateral knee. A sample size of 6 to 10 mice for controls and TSDV groups was used at each timed assay after intraarticular injections (IAs) of the controls or TSDV, starting one week after DMM surgery. The mice joints were analyzed histologically at weeks two and four, as shown in FIGS. 4A and 4B. An in vitro functional dosage of PFD of 100 ug/ml, was achieved using 100 mg of PFD-PLGA microspheres (~25 μg of PFD/sphere) were injected within the TSDV at each injection treatment administered monthly. The mice knee joints were analyzed by H&E staining at two and four weeks after DMM surgery, which is one or three weeks after a first injection. The thickened knee synovium of DMM/OA mice with the controls, PBS and HA+PLGA injections displayed joint inflammation, while the synovial lining cells layer were thin for the TSDV injected knees. Likewise, analysis by Safranin O staining, as shown in FIGS. 5A and 5B, indicated that the cartilage health and subchondral bone structure were maintained of the DMM mice, where slight fibrillations on articular surface and osteophyte formation were found in the PBS and HA+PLGA control groups at 2 weeks after DMM surgery, while osteophyte formation was inhibited in TSDV treated group.

Pain Relief by the TSDV in the Mice OA Model

Figure 7A:
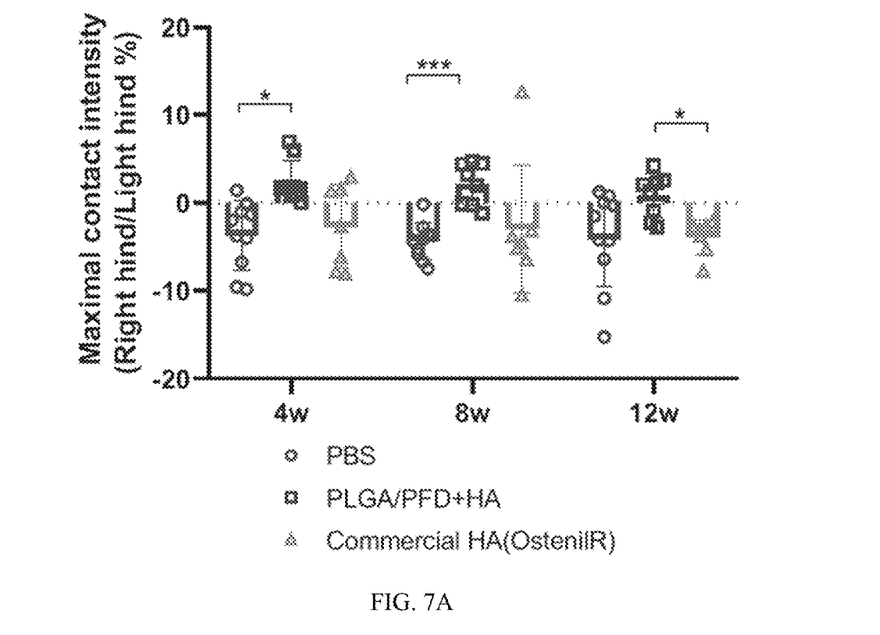
FIG. 7A is a chart of the maximal contact intensity pressed by mice's DDM treated (right) paw relative to the intensity of the mice's untreated (left) paw for PBS injected joints, HA injected joints, and TSDV injected joints, according to an embodiment.
Figure 7B:
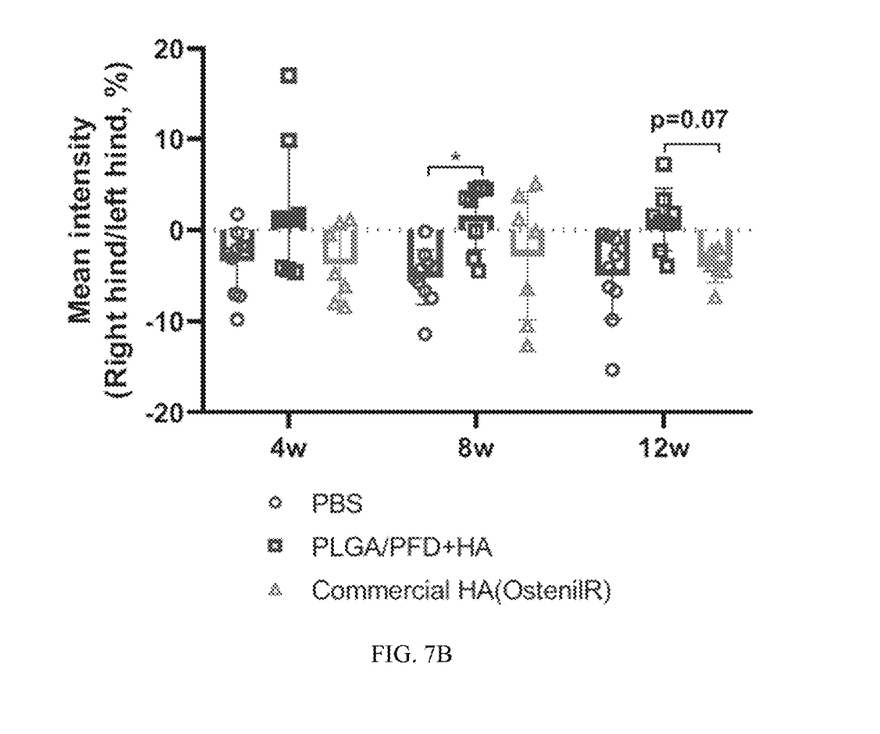
FIG. 7B is a chart of the mean intensity (MI) pressed by mice's DDM treated (right) paw relative to the intensity of the mice's untreated (left) paw for PBS injected joints, HA injected joints, and TSDV injected joints, according to an embodiment.

Footprints and gait analysis of mice with DMM and the TSDV treatment, as shown in FIGS. 6A, 6B, 7A and 7B, was performed with footprints recorded by a Catwalk System (Noldus XT 9.0) at four, eight and twelve weeks after DMM surgery, i.e., three weeks after a first injection, three weeks after a second injection, and three weeks after a third injection. The gait panel records the pawprints from the left front, left hind, right front, and right hind (DMM side) of the animal. The representative pawprints of right hind side was enlarged, as shown In FIGS. 6A and 6B. A maximal contact intensity (MCI) represents a mean intensity of a paw at maximal contact, with the baseline established for the individual animals at 1 week after DMM surgery treatment but before the treatment. As shown in FIG. 7A, MCIs above zero indicate stronger steps and values below zero indicate enhanced pain and less load-bearing of the limb. IA of a PBS solution and a commercial therapeutic HA solution did not reverse the impairment of MCI (load-bearing) compared to the pre-injection baseline. The TSDV treated mice showed significant improvement in MCI at four weeks (three weeks after a first injection), eight weeks (three weeks after a second injection), and twelve weeks (three weeks after a third injection) after DMM. As shown in FIG. 7B, a mean intensity (MI) analysis over the entire paw prints of the track represents the gait, pain, and mechanical loadings of the animals on the paws shows similar results to that of the MCI analysis, as shown in FIG. 7A. Again, IA administration of PBS and commercial therapeutic HA solutions did not reverse impairment of MCI load-bearing relative to an untreated baseline. The TSDV treated mice showed significant improvement in MI at eight weeks (three weeks after a second injection) and twelve weeks (three weeks after a third injection) after DMM.

It should be understood that the examples and embodiments described herein are for illustrative purposes only and that various modifications or changes in light thereof will be suggested to persons skilled in the art and are to be included within the spirit and purview of this application and the scope of the appended claims. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

All publications referred to or cited herein are incorporated by reference in their entirety, including all figures and tables, to the extent they are not inconsistent with the explicit teachings of this specification.

REFERENCES

Fava R, Olsen N, Keski-Oja J, Moses H, Pincus T. Active and latent forms of transforming growth factor beta activity in synovial effusions. *J Exp Med* 1989; 169:291-296.

Couchourel D, Aubry I, Delalandre A, Lavigne M, Martel-Pelletier J, Pelletier J P, et al. Altered mineralization of human osteoarthritic osteoblasts is attributable to abnormal type I collagen production. *Arthritis Rheum* 2009; 60:1438-1450.

Zhu X, Chan Y T, Yung P S H, Tuan R S, Jiang Y. Subchondral Bone Remodeling: A Therapeutic Target for Osteoarthritis. Front Cell *Dev Biol* 2021; 8.

Maher T M, Corte T J, Fischer A, Kreuter M, Lederer D J, Molina-Molina M, et al. Pirfenidone in patients with unclassifiable progressive fibrosing interstitial lung disease: a double-blind, randomised, placebo-controlled, phase 2 trial. *Lancet Respir Med* 2020; 8:147-157.

Makadia H K, Siegel S J., Poly lactic-co-glycolic acid (PLGA) as biodegradable controlled drug delivery carrier. *Polymer (Basel)* 2011; 3(3):1377-1397.

US Patent Application Publication No. 20200093769A1, Mar. 26, 2020.

European Patent Application EP 3747460A1, Dec. 9, 2020.

US Patent Application Publication No. 20110274759A1, Nov. 10, 2011.

U.S. Pat. No. 9,872,881B2, Jan. 23, 2018.

We claim:

1. A therapeutic sustained delivery vehicle (TSDV), comprising a plurality of microparticles consisting of a TGFβ1 inhibitory drug, within a poly(lactic-co-glycolic acid) (PLGA) matrix, wherein the microparticles are suspended in a hyaluronic acid (HA) comprising solution, wherein the TGFβ1 inhibitory drug is a pirfenidone (PFD), wherein the TSDV is employed as a disease-modifying osteoarthritis drug (DMOAD), with an effective dosage of PFD at about 100 μg/ml, and wherein PFD is released over a period in excess of one month after intraarticular introduction to a patient.

2. The therapeutic sustained delivery vehicle (TSDV) according to claim 1, wherein the PLGA matrix comprises a 50:50, lactic:glycolic repeating unit ratio and the PlGA matrix has a molecular weight of 20 to 50 kDa.

3. The therapeutic sustained delivery vehicle (TSDV) according to claim 1, wherein the weight ratio of PFD to PLGA is about 1:2.

4. The therapeutic sustained delivery vehicle (TSDV) according to claim 1, wherein the HA has a molecular weight of about 1,200 kDa to about 6,000 kDa and the HA solution is about 0.5 to about 3% HA in a stroke-physiological saline solution (SPSS) or phosphate buffer solution (PBS).

5. The therapeutic sustained delivery vehicle (TSDV) according to claim 1, wherein the microparticles are present at about 6 mg/ml in the HA solution.

6. The therapeutic sustained delivery vehicle (TSDV) according to claim 1, wherein the microparticles are microspheres with a diameter of about 1300 nm.

7. A method of preparing a therapeutic sustained delivery vehicle (TSDV) according to claim 1, comprising:
providing a plurality of microparticles comprising pirfenidone (PFD) within a poly(lactic-co-glycolic acid) (PLGA) matrix;
providing a hyaluronic acid (HA) solution; and
suspending the plurality of microparticles in the HA solution.

8. The method of preparing a TSDV according to claim 7, wherein providing the plurality of microparticles comprises:
combining PFD and PLGA in a water insoluble organic solvent to form an organic solution;
adding the organic solution to a polyvinyl alcohol solution to form an oil in water emulsion;
stirring the emulsion and evaporating the organic solvent from the emulsion wherein there is a suspension of microparticles; and
isolating the microparticles from the suspension.

9. The method of preparing a TSDV according to claim 8, wherein isolating comprises centrifuging.

10. The method of preparing a TSDV according to claim 9, further comprising washing, resuspending, re-centrifuging, and lyophilizing the microparticles.

11. A method of treating a joint inflicted with osteoarthritis (OA), comprising: providing a therapeutic sustained delivery vehicle (TSDV) comprising a plurality of microparticles consisting of a TGFβ1 inhibitory drug, within a poly(lactic-co-glycolic acid) (PLGA) matrix, wherein the TGFβ1 inhibitory drug is a pirfenidone (PFD), and wherein the microparticles are suspended within a hyaluronic acid (HA) comprising solution to form the TSDV as a disease-modifying osteoarthritis drug (DMOAD) having an effective dosage of PFD of about 100 μg/ml; and periodically injecting the TSDV into the joint wherein PFD is released over a period in excess of one month after each injecting.

12. The method of treating a joint inflicted with OA according to claim 11, wherein periodically injecting comprises injecting one time a month or less.

13. The method of treating a joint inflicted with OA according to claim 11, wherein the dosage of PFD in each of the injections is about 100 μg/ml.

\* \* \* \* \*